United States Patent
Veillon

(10) Patent No.: US 10,562,430 B1
(45) Date of Patent: Feb. 18, 2020

(54) ADJUSTABLE RECEPTACLE HOLDER

(71) Applicant: Kris A. Veillon, Vacherie, LA (US)

(72) Inventor: Kris A. Veillon, Vacherie, LA (US)

( * ) Notice: Subject to any disclaimer, the term of this patent is extended or adjusted under 35 U.S.C. 154(b) by 0 days.

(21) Appl. No.: 16/174,505

(22) Filed: Oct. 30, 2018

(51) Int. Cl.
*A47K 1/08* (2006.01)
*B60N 3/10* (2006.01)
*F16B 2/12* (2006.01)

(52) U.S. Cl.
CPC ............. *B60N 3/106* (2013.01); *B60N 3/103* (2013.01); *F16B 2/12* (2013.01)

(58) Field of Classification Search
CPC ........ A47G 7/025; F04D 29/646; B60N 3/102
See application file for complete search history.

(56) References Cited

U.S. PATENT DOCUMENTS

| | | | | |
|---|---|---|---|---|
| 1,912,287 A * | 5/1933 | Lundell | ................. | F04D 29/646 248/285.1 |
| 4,943,111 A | 7/1990 | VanderLaan | | |
| 4,984,722 A | 1/1991 | Moore | | |
| 5,141,194 A | 8/1992 | Burgess et al. | | |
| 5,560,578 A * | 10/1996 | Schenken | ............... | B60N 3/101 248/229.21 |
| 6,227,513 B1 * | 5/2001 | Richard | .................. | A47G 7/025 211/43 |
| 8,579,149 B2 * | 11/2013 | Henke | .................... | B60N 3/106 220/634 |
| 2005/0269472 A1 * | 12/2005 | Wagner | ................. | B60N 3/102 248/311.2 |

* cited by examiner

*Primary Examiner* — Amy J. Sterling
(74) *Attorney, Agent, or Firm* — Sanchelima & Associates, P.A.; Christian Sanchelima; Jesus Sanchelima

(57) ABSTRACT

An adjustable receptacle holder for securely supporting a receptacle within a vehicle comprises a telescopic base member and a cylindrical holding member. The telescopic base member is removably inserted into a cup holder of the vehicle. The telescopic base member is configured to vertically extend and retract to suitably position the cylindrical holding member. The cylindrical holding member is rotatably attached to the telescopic base member and comprises sidewalls and an opening. The opening is configured in the sidewall of the cylindrical holding member to accommodate a handle of the receptacle. The cylindrical holding member is divided into four sections, each section comprising a ribbed guide rail configured on the base of the cylindrical holding member for radial adjustments to secure receptacles of varied base dimensions. Further, release tabs are provided on an exterior surface of each of the four sections to release the secured receptacle.

7 Claims, 4 Drawing Sheets

ADJUSTABLE RECEPTACLE HOLDER

BACKGROUND OF THE INVENTION

Field of the Invention

The present disclosure generally relates to receptacle holders. More particularly, the present disclosure relates to an adjustable receptacle holder for securely supporting a receptacle within a vehicle.

Description of the Related Art

Cup holders and compartments for storing water bottles are essential components of a vehicle interior. Most automobiles have one or more cup holders placed near the central console of the automobile. However, some of the existing cup holders provided in vehicles are a perfect fit for only certain sizes of containers. For instance, a cup holder may tightly hold an average sized cup but not a smaller cup. In situations where the vehicle suddenly brakes or takes a sharp turn, this is highly disadvantageous as the cup and its contents will end up falling over. A cup holder, which is adjustable to tightly or securely hold cups or containers of varied sizes, is therefore desired. Several adjustable cup holders have been designed over the years and are therefore known in the art. For instance, U.S. Pat. No. 4,984,722 by Steven W. Moore discloses an adjustable cup holder removably attached to automobile doors via door-mounting brackets. The adjustable cup holder comprises an upper bracket having a pair of opposing arms comprised of a plurality of connected lengths and extending from the upper bracket horizontally, each pair of adjacent lengths forming an obtuse angle between them, the plurality of lengths cumulatively approximating an arc. Although the disclosed cup holder is adjustable, a user must be careful whenever he/she enters or exits the vehicle as the cup holder is mounted on the door.

Another variable dimension cup holder is illustrated in U.S. Pat. No. 4,943,111, issued Jul. 24, 1990, in the name of VanderLaan. The patent discloses a container holder which is stored in an armrest and pivoted to its use position. A container support slides relative to another side such that facing surfaces can engage opposite sides of different diameter containers. Although the disclosed cup holder is adjustable to accommodate different sized cups, its height cannot be adjusted to provide ease of access to a user. There are also known cup holders which extend and retract to support a container. Representative of such cup holders is U.S. Pat. No. 5,141,194 issued Aug. 25, 1992, in the name of Burgess, et al. The patent discloses a retractable container holder which is stored in an upright, flat pocket and has four hinged plates which open into an inverted triangle shape, the top of which has apertures for receiving containers in the sides of plates which are also apertured to allow container to stand on a flat base. As in the case of U.S. Pat. No. 4,943,111, issued in the name of VanderLaan, the height of the disclosed cup holder cannot be adjusted to suitably position the container or cup. As seen above, there exists a need for a size adjustable cup holder that overcomes the drawbacks and limitations of the art, is of low complexity, has low manufacturing costs and is not prone to defects.

Hence, there is a long felt but unresolved need for a cup holder, which is adjustable to tightly or securely hold cups or containers of varied sizes. Moreover, there is a need for a cup holder, in which height can be adjusted suitably to provide easier access to a user.

SUMMARY OF THE INVENTION

The invention, disclosed herein, addresses the above-mentioned need for a cup holder, which is adjustable to tightly or securely hold cups or containers of varied sizes. Moreover, there is a need for a cup holder, whose height can be adjusted suitably to provide easier access to a user.

The adjustable receptacle holder, disclosed herein, for securely supporting a receptacle within a vehicle comprises a telescopic base member and a cylindrical holding member. The telescopic base member is removably inserted into a cup holder of the vehicle. The telescopic base member is configured to vertically extend and retract to suitably position the cylindrical holding member. The cylindrical holding member is rotatably attached to the telescopic base member and comprises sidewalls and an opening. The cylindrical holding member is divided into four sections, each section comprising a ribbed guide rail configured on the base of the cylindrical holding member for radial adjustments to secure receptacles of varied base dimensions. Further, release tabs are provided on an exterior surface of each of the four sections to release the secured receptacle. The opening is configured in the sidewall of the cylindrical holding member to accommodate a handle of the receptacle. The cylindrical holding member is further configured to radially expand or contract to securely support the receptacle within the vehicle.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
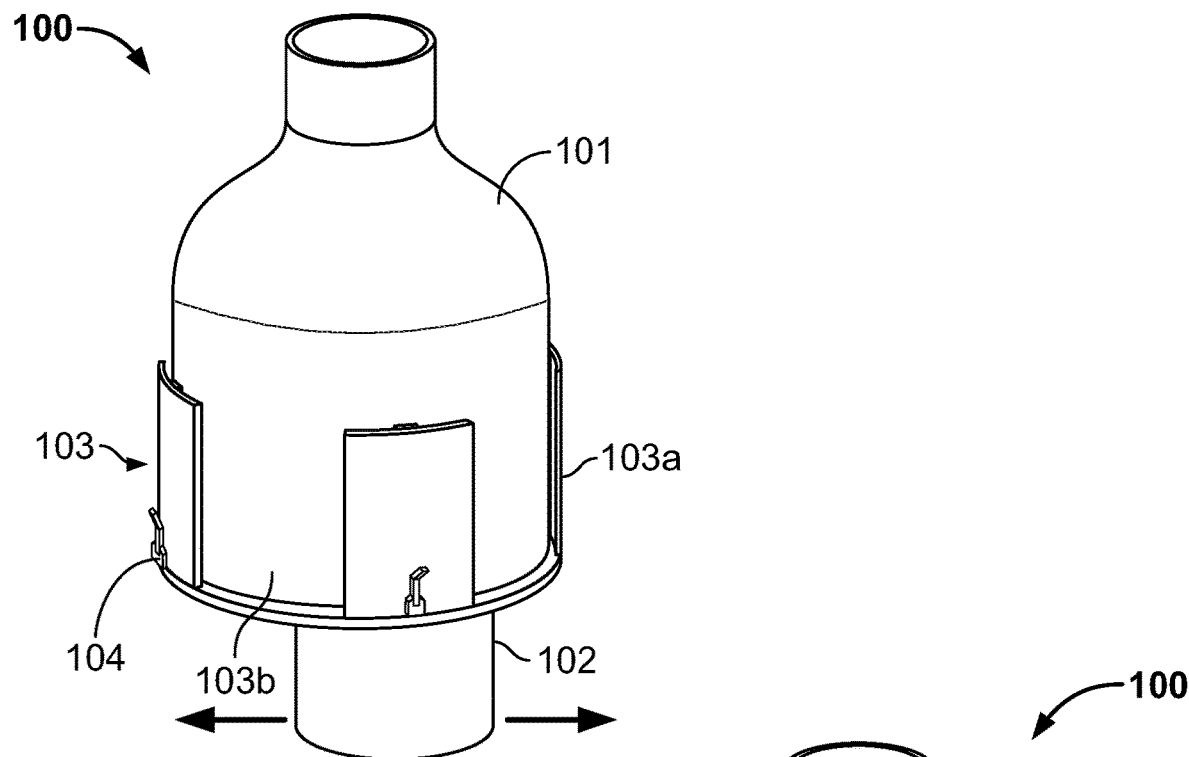
FIGS. 1 and 1A exemplarily illustrate a perspective view of an adjustable receptacle holder showing a receptacle mounted thereon in which a telescopic base member is adjusted in different positions.

FIG. 1 exemplarily illustrates a perspective view of an adjustable receptacle holder 100 showing a receptacle 101 mounted on the adjustable receptacle holder 100. As used herein, "receptacle" refers to a hollow container or vessel for storing a beverage or a fluid. The receptacle 101, is for example, a water bottle, a cup, a sipper, a health drink container, a baby bottle, etc. The adjustable receptacle holder 100 for securely supporting a receptacle 101 within a vehicle comprises a telescopic base member 102 and a cylindrical holding member 103.

Figure 1A:
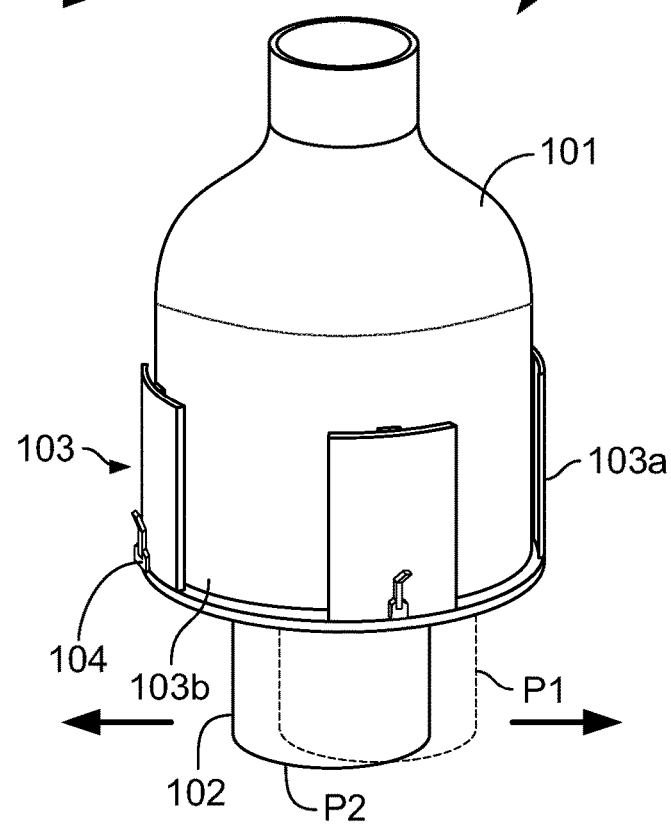

The telescopic base member 102 is removably inserted into a cup holder of the vehicle, for example, proximal to the gear shifter, console, etc. In one embodiment, the telescopic base member 102 is configured to operate between two positions i.e., between a first position P1 and a second position P2, as shown in FIG. 1A. In another embodiment, the telescopic base member 102 is configured to vertically extend and retract to suitably position the cylindrical holding member 103 as exemplarily illustrated in FIGS. 2-2A. In one embodiment, the telescopic base member 102 may be attached to a central portion of a bottom surface of the cylindrical holding member 103. Alternately, the telescopic base member 102 may be configured to be attached to a portion of the bottom surface of the cylindrical holding member 103 that is entirely offset in any direction from the center of the bottom surface of the cylindrical holding member 103. In an exemplary embodiment, the telescopic base member 102 may be offset by $\frac{3}{4}^{th}$ of an inch from the central portion of the bottom surface of the cylindrical holding member 103. The cylindrical holding member 103 is rotatably attached to the telescopic base member 102 and comprises sidewalls 103a and an opening 103b. The opening 103b is configured in the sidewall 103a of the cylindrical holding member 103 to accommodate a handle of the receptacle 101.

The cylindrical holding member 103 is further configured to radially expand or contract to securely support the receptacle 101 within the vehicle. The cylindrical holding member 103 is divided into four sections, each section comprising a ribbed guide rail 103c configured on the base 103d of the cylindrical holding member 103 for radial adjustments to secure receptacles 101 of varied base dimensions as exemplarily illustrated in FIGS. 3-3A. Further, release tabs 104 are provided on an exterior surface of each of the four sections of the cylindrical holding member 103 to release the secured receptacle 101, when necessary. As used herein, "release tabs" refer to a mechanism for releasably securing the receptacle 101 within the cylindrical holding member 103 of the adjustable cup holder 100. As such, different mechanisms apart from the mechanism described in the preferred embodiment may be interchangeably used based on design requirements and user preference.

Figure 2:
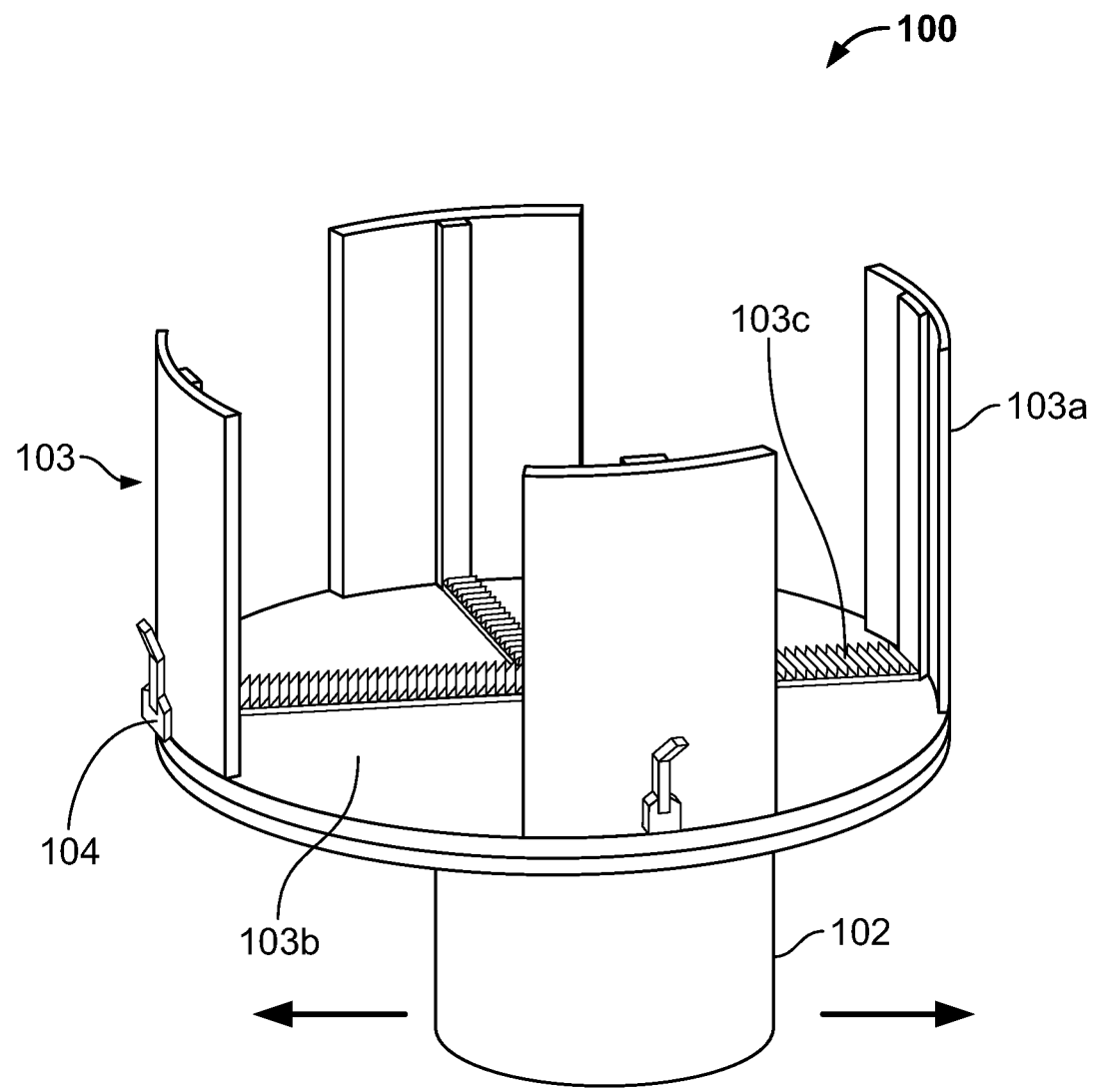
FIG. 2 exemplarily illustrates a perspective view of an adjustable receptacle holder in a retracted position.
Figure 2A:
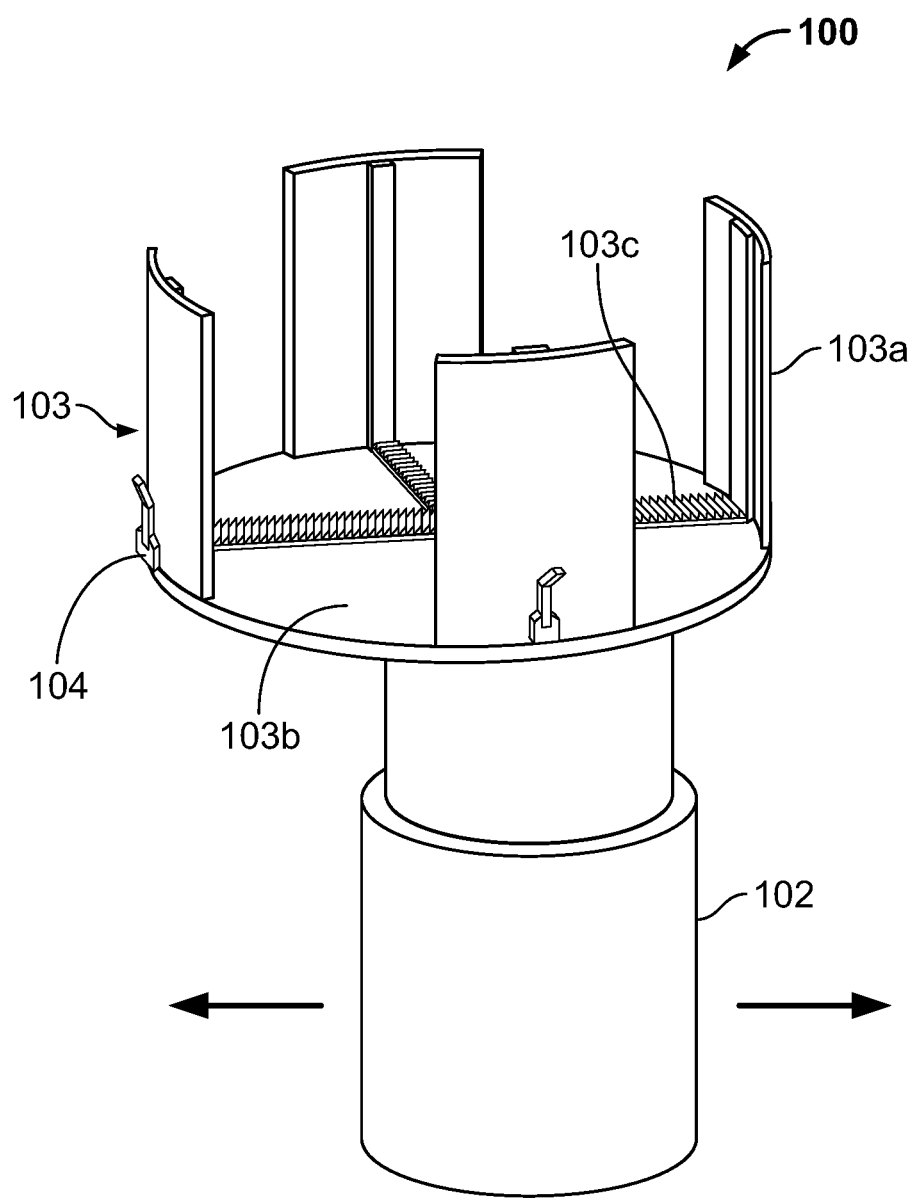
FIG. 2A exemplarily illustrates a perspective view of an adjustable receptacle holder in an extended position.

FIG. 2 exemplarily illustrates a perspective view of an adjustable receptacle holder 100 in a retracted position. FIG. 2A exemplarily illustrates a perspective view of an adjustable receptacle holder 100 in an extended position. The adjustable receptacle holder 100 extends and retracts to meet best height requirements and has adjustable offsets to avoid objects on the vehicle console. Additionally, the adjustable receptacle holder 100 securely grips cups of average sizes and adjusts in small increments to receive receptacles 101 of sizes up to 5.5 inches containing fluids of approximately a half gallon. The telescopic base member 102 extends and retracts the adjustable receptacle holder 100.

Figure 3:
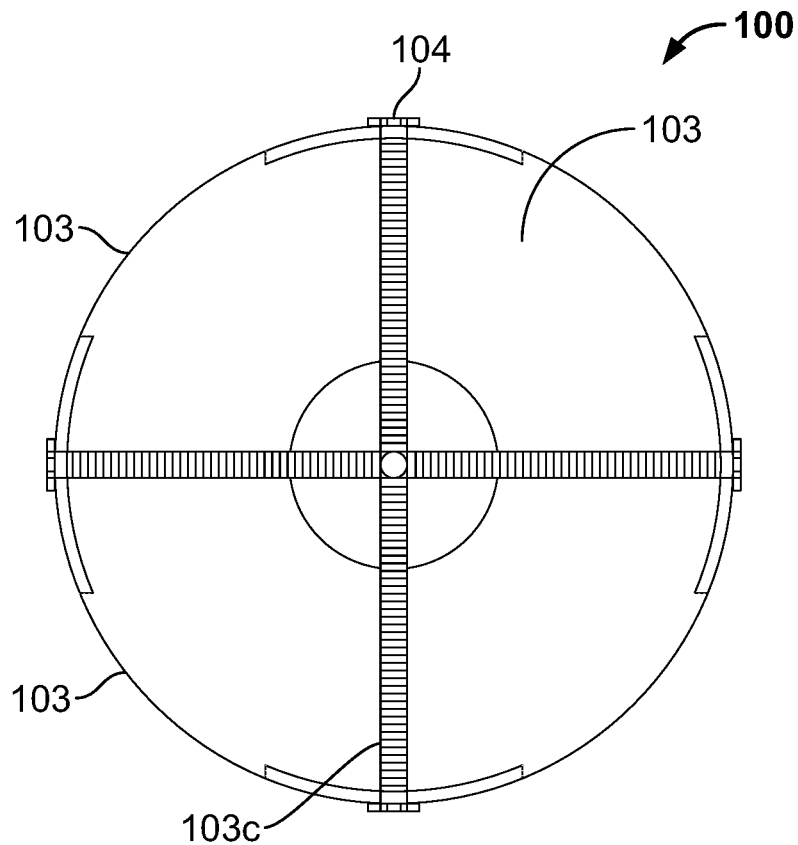
FIG. 3 exemplarily illustrates a top plan view of a cylindrical holding member.
Figure 3A:
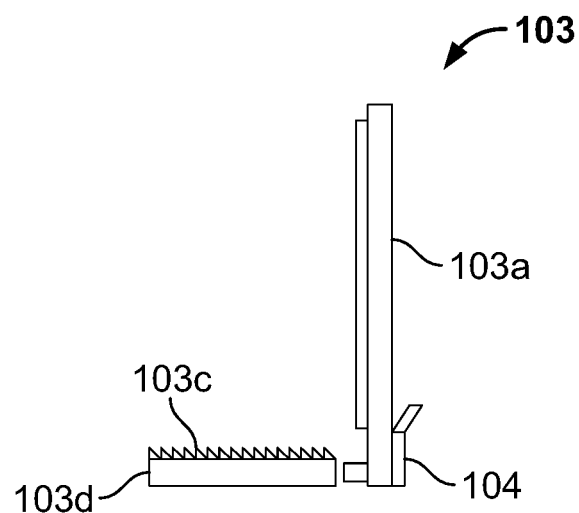
FIG. 3A exemplarily illustrates a side view of a cylindrical holding member.

FIG. 3 exemplarily illustrates a top plan view of a cylindrical holding member 103. FIG. 3A exemplarily illustrates a side view of a cylindrical holding member 103. The cylindrical holding member 103 is rotatable clockwise and anti-clockwise for desired handle position. The cylindrical holding member 103 adjusts radially in small increments to accommodate receptacles of all sizes ranging from a baby's bottle up to a 5.5-inch half gallon jug. In the preferred embodiment of the present invention, the cylindrical holding member 103 is divided into four sections, each section comprises a ribbed guide rail 103c configured on the base 103d of the cylindrical holding member 103 for radial adjustment to secure receptacles 102 of varied base dimensions. Further, release tabs 104 are provided on an exterior surface of each of the four sections to release the secured receptacle. The adjustable receptacle holder 100 stops oversized drinks from spilling inside the vehicle and provides a place to secure beverage containers so they do not roll off the seat or fall over and leak.

In an embodiment, the adjustable receptacle holder 100 is made of a light weight durable plastic and completely adjustable to fit most vehicles. For instance, the sidewalls 103a are made of a ⅛-inch thick soft neoprene layer and are 3-inches wide and 2.5-inches high. In an embodiment, the exterior of the cylindrical holding member 103 includes logos of baseball, basketball, or football teams, and can be made in a wide variety of colors. The adjustable receptacle holder 100 is for consumers who drive long distances, sports and fitness enthusiasts, individuals who eat on the road, truck drivers, mothers with infants, etc.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An adjustable receptacle holder, comprising:
a telescopic base member, wherein said telescopic base member is removably insertable into a cup holder of a vehicle console; and
a cylindrical holding member placed on the telescopic base member, wherein the cylindrical holding member comprises a base and a plurality of sidewalls, wherein said sidewalls are the same shape and are spaced apart an equal distance along an outer circumference of said cylindrical holding member, wherein each of said sidewalls further include a release tab mounted on the bottom end of said sidewalls, wherein said release tab is mounted at an outer surface area of said sidewalls, wherein said sidewalls further include a rectangular member longitudinally mounted along an inner surface area of said sidewalls, wherein said rectangular member provides an additional grip for a receptible held within said sidewalls, wherein each of the sidewalls comprises a first ribbed guide rail and a second ribbed guide rail placed on the base of the cylindrical holding member, wherein said first ribbed guide rail and said second ribbed guide rail is provided in axis with the respective sidewall such that each of the sidewalls is slid radially along respective ribbed guide rail to adjust the position of the sidewalls to receive a receptacle, wherein said release tabs lock the position of said sidewalls into said first ribbed guide rail and said second ribbed guide rail, wherein said first ribbed guide rail is longitudinally mounted thereon said cylindrical holding member and extends the entire diameter of said cylindrical holding member, wherein said second ribbed guide rail is longitudinally mounted thereon said cylindrical holding member and extends the entire diameter of said cylindrical, wherein said first ribbed guide rail and said second guide rail meet across a central point on said cylindrical holding member to form a cross shape, wherein said first ribbed guide rail and said second ribbed guide rail are mounted in a perpendicular configuration such that four right angles are formed, wherein said telescopic base member is mounted to a bottom end of said cylindrical holding member, wherein said telescopic base member shifts from a center position of said bottom end to an off center position to avoid structures on said vehicle console, wherein said cylindrical holding member is adjustable radially and vertically for larger sized receptacles.

2. The adjustable receptacle holder of claim 1, wherein the telescopic base member is operable vertically to adjust the height of the telescopic base member.

3. The adjustable receptacle holder of claim 1, wherein the cylindrical holding member comprises openings provided between two adjacent sidewalls.

4. The adjustable receptacle holder of claim 1, wherein the telescopic base member is removably coupled to the base of the cylindrical holding member.

5. The adjustable receptacle holder of claim 4, wherein the telescopic base member is coupled to the base that is entirely offset in any direction from the center of the base of the cylindrical holding member.

6. The adjustable receptacle holder of claim 5, wherein the telescopic base member is coupled to the base that is offset from the center of the base by $3/4^{th}$ of an inch.

7. An adjustable receptacle holder, comprising:
a telescopic base member, wherein said telescopic base member is removably inserted into a cup holder of a vehicle console;
a cylindrical holding member placed on the telescopic base member, wherein the cylindrical holding member comprises a base and a plurality of sidewalls;
a plurality of ribbed guide rails placed on the base of the cylindrical holding member, wherein each of the plurality of ribbed guide rails is placed in axis with a sidewall, wherein said plurality of ribbed guide rails extend across the entire diameter across a top end of said cylindrical holding member, wherein said plurality of ribbed guide rails are mounted in a perpendicular configuration across said top end of said cylindrical holding member; and
a release tab provided at outer surface of each of the sidewalls,
wherein each of the sidewalls is slid radially along respective ribbed guide rail to adjust the position of the sidewalls to receive a receptacle, and wherein the release tab is used to lock the position of the sidewall.

* * * * *